United States Patent [19]
Cohen

[11] 4,114,316
[45] Sep. 19, 1978

[54] GROWING PLANTS IN AN AQUARIUM

[76] Inventor: Merrill Cohen, 3418 Edcrest Rd., Baltimore, Md. 21207

[21] Appl. No.: 850,645

[22] Filed: Nov. 11, 1977

Related U.S. Application Data

[63] Continuation-in-part of Ser. No. 697,028, Jun. 7, 1976, Pat. No. 4,074,997.

[51] Int. Cl.² ............... A01G 31/02; A01K 63/00
[52] U.S. Cl. .................................. 47/64; 119/5; 71/24; 47/DIG. 7; 71/64 R
[58] Field of Search ............... 119/3, 5; 47/59, 62–64, 47/73–74, 77, 87, DIG. 7, 44, 41.13, 41.12, 41.11; 71/24, 64 R, 64 G

[56] References Cited

U.S. PATENT DOCUMENTS

| | | | |
|---|---|---|---|
| 715,571 | 12/1902 | Gillinder | 47/41.13 X |
| 1,169,449 | 1/1916 | Williamson | 119/5 |
| 2,245,495 | 6/1941 | Pemble | 119/3 X |
| 2,988,441 | 6/1961 | Pruitt | 47/DIG. 7 |
| 3,562,952 | 2/1971 | Bramante | 47/44 |
| 3,798,836 | 3/1974 | Rubens et al. | 47/63 |
| 3,812,619 | 5/1974 | Wood et al. | 47/DIG. 7 |
| 3,899,850 | 8/1975 | Gluck et al. | 47/74 |
| 3,961,445 | 6/1976 | Rack | 47/74 |
| 4,034,506 | 7/1977 | Kasahara et al. | 47/64 |
| 4,074,997 | 2/1978 | Cohen | 71/24 |

*Primary Examiner*—Robert E. Bagwill
*Attorney, Agent, or Firm*—Berman, Aisenberg & Platt

[57] ABSTRACT

An integral, non-floating, plant-food enriched, growth-supporting and plant-holding solid substrate is provided for rooting and growing aquatic plants submerged in water. The substrate comprises a water-cured hydrophilic-polyurethane-prepolymer foam composition in which plants (submerged in water) are grown.

6 Claims, No Drawings

GROWING PLANTS IN AN AQUARIUM

RELATED APPLICATION

This application is a continuation-in-part of application Ser. No. 697,028, filed on June 7, 1976 and now U.S. Pat. No. 4,074,997. The entire disclosure of parent application Ser. No. 697,028 is incorporated herein by reference.

BACKGROUND

There is a need in the aquarium field for means of using soil in aquariums for growing certain rooted aquatic plants. Prior to the present invention soil was placed in a small pot; the pot was carefully lowered into an aquarium with some sand or gravel on top of the soil to keep the soil from dispersing (by flotation) in the water of the aquarium; and then the pot was buried under gravel in the aquarium. Fish in the aquarium would inevitably disturb the gravel covering the pot, and the soil thereunder would disseminate throughout much of the aquarium.

As confirmed, e.g., by Gerhard Brünner's "Aquarium Plants", T.F.H. Publications, Inc., Ltd., 1973, there is material interaction between fish and plants in an aquarium; the presence of the fish has a profound effect on the plants, and vice versa. There is an interdependency.

SUMMARY OF THE INVENTION

A water-cured hydrophilic-polyurethane-prepolymer foam composition is provided as a substrate in which aquatic plants are grown. The aquatic plants are those which grow from a submerged substrate rather than merely floating on the surface.

Components of the composition are substantially-permanently bonded together by the water-cured foam even when the substrate is submerged in water over an extended period of time.

The substrate provides an integral, non-floating (heavier- or denser-than-water), plant-food-enriched, growth-supporting and plant-holding solid means for rooting and growing aquatic plants in general, and particularly those submerged in an aquarium.

An object of the invention is to provide such a substrate. A further object is to root and to grow aquatic plants in the substrate submerged in water. An additional object is to grow such plants in an aquarium with fish. Still further objects will be apparent from the following description.

DETAILS

A plant-food-enriched admixture (a) of loam, clay, peat moss and builders' sand is prepared. The plant food comprises any ingredient which enhances or facilitates the growth or health of a plant as well as any ingredient which counteracts, retards or prevents attack of plant life by elements, conditions, microorganisms, parasites, insects, etc. Such plant food is primarily, but not necessarily, concerned with providing a source of nitrogen, phosphorus (e.g. in the form of phosphoric acid) and/or potassium (e.g. in the form of potash) and includes one or more ingredients referred to by Herrett [U.S. Pat. No. 3,336,129] as an "active agent", defined as a material (organic, inorganic, organometallic or metalloorganic) which, when in contact or in close association with plants, alters, modifies or promotes their growth, their well-being or longevity either directly or indirectly. Available marketed plant foods having, e.g., equal parts by weight of sources of nitrogen, phosphorus and potassium, such as "NUTRI-20", are suitable either alone or in combination with any other plant food.

The weight ratio of loam/clay/(peat moss)/(builders' sand) can vary, e.g. independently, from about 0.8 to about 1.2 parts of each, but it is preferred to have substantially equal amounts by weight of each. The amount and precise type of plant-food enrichment are not critical factors beyond the limitation that the amount must be sufficient to effect its purpose in the context of the cured, water-retaining foam product filled therewith. Increasing the amount of builders' sand so that the ratio of loam/clay/(peat moss)/(builders' sand) is about 1:1:1:1.25 results in water-cured hydrophilic prepolymer foam which is denser than water and will not float in an aquarium, even without a separate weighting component. Further increasing the proportion of builders' sand likewise yields a denser-than-water cured foam.

By "loam" is meant any rich, dark soil. The term, "clay", is used to include natural plastic mixtures of silica and alumina, e.g. bentonite and montmorillonite, which contain other constituents. Peat moss is any plant, e.g. of the genus, *Sphagnum*, which becomes peat.

A hydrophilic foam-forming prepolymer is admixed with admixture (a) and with from about 7 to about 13, preferably about 10, times its volume of water before being cured into a substantially homogeneous, solid, water-retaining, non-rigid, open-cell foam. Since the prepolymer is thoroughly admixed with the components of admixture (a) prior to curing, such components act as filler for and an integral part of the resulting foam. The amount of prepolymer necessary is only that required to maintain the resulting cured foam integral both in air and when submerged in water. Ordinarily the volume of foam-forming prepolymer is from about one eighth to about one fourteenth that of admixture (a) combined therewith.

Any hydrophilic foam-forming prepolymer is useful for this purpose as long as the cured foam obtained therefrom is water-retentive, non-rigid, open-cell foam which is effectively water insoluble and non toxic to plants and to fish. The filled and cured foam must effectively retain its integrity even when submerged in water over prolonged periods of time. A water-curable plastic-foam-forming prepolymer is most advantageously employed for this purpose.

Suitable prepolymers are the foam-forming prepolymers disclosed by Wood [U.S. Pat. Nos. 3,812,618, 3,812,619 and 3,889,417] or by Cogliano [U.S. Pat. No. 3,874,964]. Water-curable hydrophilic foam-forming polyurethane prepolymers of the type disclosed in these patents are particularly useful for the intended purpose.

The thus-prepared filled foam (plant-growth medium) chemically bonds and holds together the soil, plant food and other ingredients of which it is composed, and yet it permits roots to penetrate without hampering their growth. The bonding of components and the insolubility of the composite provides a product which will not cloud an aquarium in which it is submerged and is not adversely affected by under-gravel filters. The plant-growth medium is useful for sprouting seeds, starting (rooting) cuttings and growing terrestial house plants in addition to providing a substrate for growing plants submerged in an aquarium. Moreover, plants grown in such a plastic-foam medium are easily transplanted without disturbing their roots or shocking their growth.

Unfortunately, thus-filled foam is ordinarily less dense than and thus floats in water unless the amount of builders' sand is sufficiently increased or some other precaution is taken. This is a deterrent to the use of such foam for growing aquatic plants in an aquarium. A, e.g., shaped volume of the foam can, however, be weighted to an extent sufficient to preclude its floating in water. Any water-insoluble material which has a sufficiently-high density, is substantially non-toxic to plants and fish and will not deteriorate or decompose when submerged in water over prolonged periods is useful for this purpose, particularly if it can be firmly secured in or to the filled foam.

A weighting component which is particularly useful is prepared by admixing the same or a similar hydrophilic prepolymer with sand, the proportion of prepolymer being at least that required (after curing) to retain the sand-filled cured polymer as an integral solid. Since the sand is denser than the polymer, particularly when the prepolymer is a foam-forming prepolymer, the greater the ratio of sand to prepolymer, the greater the density of the sand-filled product.

If the same foam-forming hydrophilic prepolymer is employed, the volume ratio of water to prepolymer is, e.g., from about 7 to about 13 and preferably about 10, whereas the volume ratio of sand to prepolymer is from about 20 to about 35, preferably about 30.

When a shaped volume of plant-growth medium is cured concurrently and in contact with a shaped volume of sand-filled prepolymer (of the same type as used in the plant-growth medium), the polymer secures the two shaped volumes together at their interface to make an effectively-permanent bond therebetween. The larger the interface, the more permanent and secure the bond.

The produced composite can be in any shape, e.g. the form of a right circular cylinder (one end of which is the weighting component) or that of a truncated cone (flower-pot shape). Likewise, if the filled and cured foam is prepared without a weighting component, it can also be in any desired shape.

When the shaped plant-growth medium (with or without a weighting component) is used for rooting a seed or a cutting or for growing a plant, it should be thoroughly wetted first. This can be accomplished by placing it in water and squeezing it from one end to the other a sufficient number of times, e.g. about ten, to remove most of the air therein. Then, slice (from one end) through about half of the foam and separate sufficiently to insert the roots, seed or cutting in the separation. If the foam does not spring back to essentially its precut position, a rubber band or other holding device can be used around the upper portion to hold the foam together. The stem of plant cuttings placed into the shaped foam should be free of leaves.

When the foam has a weighting component and is used in an aquarium, it need not be placed under gravel. If it is, it should not be covered by more than a fine layer. In any event, the "crown" of a plant should not be covered.

From the preceding description one skilled in the art can prepare and use the subject invention in each of its aspects. The following specific embodiments are merely illustrative and do not, in any way, limit the remainder of the disclosure. In the examples which follow, quantities are expressed in parts by weight and in parts by volume. The relationship between parts by weight and parts by volume is the same as that between grams and cubic centimeters or between 62.5 pounds and one cubic foot.

EXAMPLE 1

Thoroughly mix 0.8 part by weight of each of loam, clay and peat moss with 1 part by weight of fine builders' sand and 0.2 part by weight of "NUTRI-20", a slow-release plant food having equal parts by weight of sources of nitrogen, phosphorus and potassium, to obtain a plant-food-enriched admixture (a).

EXAMPLE 2

Keeping all other amounts and components the same, repeat Example 1 with 1.2 parts by weight of fine builders' sand to obtain a similar plant-food-enriched admixture (a).

EXAMPLE 3

Thoroughly mix 1.2 parts by weight of each of loam, clay and peat moss with 1 part by weight of fine builders' sand and 0.3 part by weight of "NUTRI-20".

EXAMPLE 4

Keeping all other amounts and components the same, repeat Example 3 with 0.8 part by weight of fine builders' sand.

EXAMPLE 5

Thoroughly mix 0.8 part by weight of each of loam and peat moss with 1 part by weight of each of bentonite and fine builders' sand and 0.2 part by weight of "NUTRI-20",

EXAMPLE 7

Thoroughly mix 0.8 part by weight of each of montmorillonite and peat moss with 1 part by weight of each of loam and fine builders' sand and 0.25 part by weight of "NUTRI-20".

EXAMPLE 8

Thoroughly mix 1 part by weight of each of loam, clay and fine builders' sand with 0.8 part by weight of peat moss and 0.3 part by weight of "NUTRI-20".

EXAMPLE 9

Thoroughly mix 1 part by weight of each of loam, peat moss and fine builders' sand with 0.8 part by weight of china clay and 0.2 part by weight of "NUTRI-20".

EXAMPLE 10

Thoroughly mix 1 part by weight of each of clay, peat moss and fine builders' sand with 0.8 part by weight of loam and 0.25 part by weight of "NUTRI-20".

EXAMPLE 11

Thoroughly mix 1 part by weight of each of loam, bentonite, peat moss and fine builders' sand with 0.3 part by weight of "NUTRI-20".

EXAMPLE 12

Thoroughly mix 0.8 part by weight of each of loam and clay with 1.2 parts by weight of sphagnum, 1 part by weight of fine builders' sand and 0.2 part by weight of "NUTRI-20".

EXAMPLE 13

Thoroughly mix 0.8 part by weight of each of loam and peat moss with 1.2 parts by weight of montmorillonite, 1 part by weight of fine builders' sand and 0.25 part by weight of "NUTRI-20".

EXAMPLE 14

Thoroughly mix 0.8 part by weight of each of clay and peat moss with 1.2 parts by weight of loam, 1 part by weight of fine builders' sand and 0.3 part by weight of "NUTRI-20".

EXAMPLE 15

Thoroughly mix 1.2 parts by weight of each of loam and peat moss with 0.8 part by weight of china clay, 1 part by weight of fine builders' sand and 0.2 part by weight of "NUTRI-20".

EXAMPLE 16

Thoroughly mix 1.2 parts by weight of each of loam and clay with 0.8 part by weight of peat moss, 1 part by weight of fine builders' sand and 0.25 part by weight of "NUTRI-20".

EXAMPLE 17

Thoroughly mix 0.8 part by weight of loam with 1.2 parts by weight of each bentonite and peat moss, 1 part by weight of fine builders' sand and 0.3 part by weight of "NUTRI-20", a water-soluble mix with trace elements and iron chelete.

EXAMPLE 18

Thoroughly mix 1 part by weight of each of loam, clay and fine builders' sand with 1.2 parts by weight of sphagnum and 0.2 part by weight of "SUPERTHRIVE", a multiple-vitamin and hormone plant-food mix.

EXAMPLE 19

Thoroughly mix 1 part by weight of each of loam, peat moss and fine builders' sand with 1.2 parts by weight by weight of montmorillonite and 0.25 part by weight of "OSMOCOTE", an 18-6-12 (relative proportions of sources of nitrogen, phosphorus and potassium, respectively) slow-release fertilizer.

EXAMPLE 20

Thoroughly mix 1.2 parts by weight of loam with 1 part by weight of each of clay, peat moss and fine builders' sand and 0.3 part by weight of "NUTRI-20".

EXAMPLE 21

Thoroughly mix 1.2 parts by weight of each of loam and china clay with 1 part by weight of each of peat moss and fine builders' sand and 0.1 part by weight of each of "SUPERTHRIVE" and "NUTRI-20".

EXAMPLE 22

Thoroughly mix 1.2 parts by weight of each of loam and peat moss with 1 part by weight of each of clay and fine builders' sand and 0.25 part by weight of "OSMOCOTE".

EXAMPLE 23

Thoroughly mix 1 part by weight of each of loam and fine builders' sand with 1.2 parts by weight of each of bentonite and sphagnum and 0.15 part by weight of each of "OSMOCOTE" and "SUPERTHRIVE".

EXAMPLE 24

Keeping all other amounts and components the same, repeat each of Examples 5 through 23 with 0.8 part by weight of fine builders' sand to obtain corresponding plant-food-enriched admixtures (a).

EXAMPLE 25

Keeping all other amounts and components the same, repeat each of Examples 5 through 23 with 1.2 parts by weight of fine builders' sand to obtain corresponding plant-food-enriched admixtures (a).

EXAMPLE 26

Thoroughly mix the product of Example 1 with an equal volume of foamable hydrophilic polyurethane prepolymer ["HYPOL FHP2000"] and water, the volume ratio of water to prepolymer being 10 to 1. [The volume ratio of water:prepolymer:(product of Example 1) is thus 10:1:11.] Pour the resulting slurry into open-ended 1.25-inch-high cylindrical molds having a diameter of about 1.5 inches and resting on a polyethylene-coated table to obtain plant-growth medium, which is a water-cured, water-retaining, non-rigid, open-cell, integral-solid foam (c), in right-circular-cylindrical shape.

EXAMPLE 27

Keeping all amounts and all other components the same, repeat Example 26 with "HYPOL FHP3000" in place of "HOPOL FHP2000" to obtain the corresponding plant-growth medium.

EXAMPLE 28

Keeping all components and all other amounts the same, repeat Examples 26 and 27 with a water/prepolymer admixture in which the volume ratio of water to prepolymer is 7 to 1 to obtain the corresponding plant-growth medium.

EXAMPLE 29

Keeping all components and all other amounts the same, repeat Examples 26 and 27 with a water/prepolymer admixture in which the volume ratio of water to prepolymer is 13 to 1 to obtain the corresponding plant-growth medium.

EXAMPLE 30

Keeping all amounts and all other components the same, repeat each of Examples 26 through 29 with the plant-food-enriched admixture (a) of each of Examples 2 through 25 to obtain the corresponding plant-growth media.

EXAMPLE 31

Thoroughly admix 1 part by volume of "HYPOL FHP3000" with 10 parts by volume of water and 30 parts by volume of sand. Pour the resulting admixture into open-ended 0.5-inch high cylindrical molds having a diameter of about 1.5 inches and resting on a polyethylene-coated table.

EXAMPLE 32

Repeat Example 31 with the same volume of "HYPOL FHP2000" in place of the "HYPOL FHP3000".

EXAMPLE 33

Before the individual moldings from Examples 31 and 32 have a chance to cure, place directly on each of them a plant-growth medium from any of Examples 26 through 30 before the selected plant-growth medium is fully cured. In this way the plant-growth medium cures with and substantially-permanently bonds to the weighting component (molding from Example 31 or Example 32); the prepolymer in each segment polymerizes with that in the other segment with which it is in direct contact.

EXAMPLE 34

Repeat Example 33 to provide plant-growth medium from each of Examples 1 through 30 with a weighting component from Example 31 or from Example 32.

EXAMPLE 35

Thoroughly mix the product of Example 2 with an equal volume of water and with about one tenth its volume of foamable hydrophilic polyurethane prepolymer ["HYPOL FHP 2000"]. Pour the resulting slurry into open-ended 1.25-inch-high cylindrical molds having a diameter of about 1.5 inches and resting on a polyethylene-coated table to obtain plant-growth medium which is water-cured, denser than water, water-retaining, non-rigid, open-cell, integral-solid foam in right-circular-cylindrical shape. The thus-obtained product requires no further weighting to maintain a fixed position submerged in water and, e.g., on the bottom of an aquarium.

EXAMPLE 36

With a razor or sharp knife cut a slit along a diameter of one base of the water-cured cylindrical product of Example 35 and extending perpendicular to the base for about one third the height of the cylinder. Submerge the thus-cut foam cylinder in water and repeatedly squeeze it from top to bottom or vice versa to remove air.

Remove the foam cylinder from the water, gently separate the two portions of the slit base and insert thereinto roots of an Amazon Sword Plant (*Echinodorus pusillus*). If the two portions of the slit base fail to return substantially to their relative pre-slit positions, place a rubber band around the outside of the cylinder at the slit end to bring these two portions back to the indicated positions.

Submerge the foam cylinder (with the plant) in water at the bottom of an aquarium stocked with fish, e.g., *Cryprinodontidae, Cichlidae, Anabantidae, Characidae, Cyprinidae, Centrarchidae* or any other family of fish.

Provide good lighting, e.g. up to 12 hours per day, in the aquarium for best results. If the cylinder is placed in gravel or sand, do not cover the crown of the plant (protruding from the cylinder) with the gravel or sand. The plant will grow and develop with no additional fertilizer.

Replacing the *Echinodorus pusillus* with other Amazon Sword Plants, e.g. *Echinodorus paniculatue var. rangerii, Echinodorus porto alegre,* or *Echinodorus marti,* with Java Fern (*Microsorium pteropus*), with Dwarf Aquarium Lilly (*Nymphae stellata*), with Sagittaria (*pusilla, sinensis, subulata* or *chilensis*) or with *Crytocoryne* (*balansae, becketti, blassi, cordata, elliptica, grabowski, griffithi, nevillii* or *purpurea*) similarly results in viable plantings.

EXAMPLE 37

Repeat Example 36, replacing one of the noted plants with a cutting thereof and making certain that the stem of the cutting (placed within the slit) is free of leaves, to root the plant, which will subsequently grow in the plant-growth medium.

EXAMPLE 38

Cutting the slit along an exposed diameter of the plant-growth-medium end of the foam cylinder, repeat the processes of Examples 36 and 37 with each composite cylinder prepared according to Example 33 and each composite cylinder prepared according to Example 34.

From the foregoing description and examples, one skilled in the art can readily ascertain the essential features of the invention. Various changes and modifications are apparent without departing from the spirit or scope thereof. It is clear that the size or shape of the plant-growth medium (whether weighted or not) is not critical beyond requirements for a particular application.

What is claimed is:

1. A process which comprises rooting an aquatic plant in integral, non-floating, plant-food-enriched, growth supporting and plant-holding solid substrate submerged in water and wherein the substrate comprises a water-cured hydrophilic-polyurethane-prepolymer foam composition having sufficient filler means to render the composition denser than water and in which components are substantially-permanently bonded together by the water-cured foam even when the solid substrate is submerged in water over an extended period of time.

2. A process which comprises growing an aquatic plant in integral, non-floating, plant-food-enriched, growth-supporting and plant-holding solid substrate submerged in water and wherein the substrate comprises a water-cured hydrophilic-polyurethane-prepolymer foam composition having sufficient filler means to render the composition denser than water and in which components are substantially-permanently bonded together by the water-cured foam even when the solid substrate is submerged in water over an extended period of time.

3. Denser-than-water substrate in combination with and submerged in water in an aquarium stocked with fish, the substrate being integral, non-floating, plant-food-enriched, growth-supporting and plant-holding solid substrate comprising a water-cured hydrophilic-polyurethane-prepolymer foam composition having sufficient filler means to render the composition denser than water and in which components are substantially-permanently bonded together by the water-cured foam even when the solid substrate is submerged in water over an extended period of time.

4. A process which comprises growing an aquatic plant in substrate according to claim 3.

5. A submerged plant planted in plant-growth medium and growing under water, the plant-growth medium being integral, non-floating, plant-food-enriched, growth-supporting and plant-holding solid substrate comprising a water-cured hydrophilic-polyurethane-prepolymer foam composition having sufficient filler means to render the composition denser than water and in which components are substantially-permanently bonded together by the water-cured foam even when the solid substrate is submerged in water over an extended period of time.

6. A submerged plant planted in plant-growth medium and growing under water in an aquarium stocked with fish, the plant-growth medium being integral, non-floating, plant-food-enriched, growth supporting and plant-holding solid substrate comprising a water-cured hydrophilic-polyurethane-prepolymer foam composition having sufficient filler means to render the composition denser than water and in which components are substantially-permanently bonded together by the water-cured foam even when the solid substrate is submerged in water over an extended period of time.

* * * * *